United States Patent
Zagorski

(10) Patent No.: US 8,126,626 B2
(45) Date of Patent: Feb. 28, 2012

(54) VEHICLE PATH CONTROL FOR AUTONOMOUS BRAKING SYSTEM

(75) Inventor: Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 927 days.

(21) Appl. No.: 12/022,197

(22) Filed: Jan. 30, 2008

(65) Prior Publication Data

US 2009/0192687 A1  Jul. 30, 2009

(51) Int. Cl.
*G06F 19/00* (2011.01)
(52) U.S. Cl. ........... 701/70; 701/36; 701/71; 701/72; 701/93; 701/96; 188/358; 188/361; 303/113.2; 303/140
(58) Field of Classification Search ............... None
See application file for complete search history.

(56) References Cited

U.S. PATENT DOCUMENTS

| | | | |
|---|---|---|---|
| 5,585,798 A * | 12/1996 | Yoshioka et al. ............ 342/70 |
| 5,669,673 A * | 9/1997 | Reuter ........................ 303/10 |
| 5,762,406 A * | 6/1998 | Yasui et al. ................. 303/146 |
| 5,762,407 A | 6/1998 | Stacey et al. |
| 5,941,919 A * | 8/1999 | Pastor et al. ................. 701/36 |
| 5,952,939 A | 9/1999 | Nakazawa et al. |
| 6,070,121 A * | 5/2000 | Matsuda ...................... 701/205 |
| 6,084,508 A | 7/2000 | Mai et al. |
| 6,226,593 B1 | 5/2001 | Kurz et al. |
| 6,269,308 B1 * | 7/2001 | Kodaka et al. ............... 701/301 |
| 6,473,681 B1 | 10/2002 | Eckert et al. |
| 6,517,172 B1 | 2/2003 | Bond, III et al. |
| 7,015,805 B2 * | 3/2006 | Knoop et al. ................ 340/467 |
| 7,035,735 B2 | 4/2006 | Knoop et al. |
| 7,213,687 B2 | 5/2007 | Sakai et al. |
| 7,245,231 B2 | 7/2007 | Kiefer et al. |
| 7,280,902 B2 | 10/2007 | Seki |
| 7,321,819 B2 * | 1/2008 | Seki ............................. 701/96 |
| 7,433,772 B2 * | 10/2008 | Isaji et al. ................... 701/71 |
| 7,469,178 B2 * | 12/2008 | Shiiba et al. ................ 701/70 |
| 7,792,624 B2 * | 9/2010 | Nakamura et al. .......... 701/72 |
| 2001/0018641 A1 * | 8/2001 | Kodaka et al. .............. 701/301 |
| 2004/0254729 A1 * | 12/2004 | Browne et al. .............. 701/301 |
| 2005/0162005 A1 * | 7/2005 | Hool et al. .................. 303/9.62 |
| 2006/0031015 A1 | 2/2006 | Paradie |
| 2006/0235598 A1 * | 10/2006 | Kudo .......................... 701/96 |
| 2007/0078584 A1 * | 4/2007 | Nakamura et al. .......... 701/93 |
| 2007/0191997 A1 * | 8/2007 | Isaji et al. ................... 701/1 |
| 2007/0219695 A1 * | 9/2007 | Chiu et al. .................. 701/51 |
| 2007/0282499 A1 * | 12/2007 | Maeda et al. ............... 701/41 |
| 2007/0288133 A1 * | 12/2007 | Nishira et al. .............. 701/23 |
| 2009/0037062 A1 * | 2/2009 | Lee et al. .................... 701/70 |

OTHER PUBLICATIONS

Society of Automotive Engineers (SAE) document on "Automotive Stability Enhancement Systems", publication J2564 (Dec. 2000, Jun. 2004).

* cited by examiner

*Primary Examiner* — Khoi Tran
*Assistant Examiner* — Jonathan L Sample

(57) ABSTRACT

A motor vehicle travel path control which monitors, during an autonomous braking event initiated by a collision preparation system the actual motor vehicle travel path in relation to the driver intended motor vehicle travel path, and in the event a departure from the driver intended motor vehicle path occurs, the motor vehicle travel path control adjusts braking so as to return the motor vehicle travel path to that intended by the driver.

9 Claims, 4 Drawing Sheets

VEHICLE PATH CONTROL FOR AUTONOMOUS BRAKING SYSTEM

TECHNICAL FIELD

The present invention relates to collision preparation systems in which autonomous braking may be provided, and more particularly to a vehicle path control during autonomous braking.

BACKGROUND OF THE INVENTION

Electronic Stability Control (ESC) is the generic term for systems designed to improve a motor vehicle's handling, particularly at the limits where the driver might lose control of the motor vehicle. See, for example, the Society of Automotive Engineers (SAE) document on "Automotive Stability Enhancement Systems", publication J2564 (12/2000, 6/2004). ESC compares the driver's intended direction in steering and braking inputs to the motor vehicle's response, via lateral acceleration, rotation (yaw) and individual wheel speeds, and then brakes individual front or rear wheels and/or reduces excess engine power as needed to help correct understeer (plowing) or oversteer (fishtailing). ESC also integrates all-speed traction control which senses drive-wheel slip under acceleration and individually brakes the slipping wheel or wheels, and/or reduces excess engine power until control is regained. ESC cannot override a car's physical limits. Of course, if a driver pushes the possibilities of the car's chassis and ESC too far, ESC cannot prevent a crash. It is a tool to help the driver maintain control. ESC combines anti-lock brakes, traction control and yaw control (yaw is spin around the vertical axis).

ESC systems use several sensors in order to determine the state the driver wants the motor vehicle to be in (driver demand). Other sensors indicate the actual state of the motor vehicle (motor vehicle response). The ESC control algorithm compares both states and decides, when necessary, to adjust the dynamic state of the motor vehicle. The sensors used for ESC have to send data at all times in order to detect possible defects as soon as possible. They have to be resistant to possible forms of interference (rain, potholes in the road, etc.). The most important sensors are: 1) steering wheel sensor, used to determine the angle the driver wants to take, often based on anisotropic magnetoresistive (AMR) elements; 2) lateral acceleration sensor, used to measure the lateral acceleration of the motor vehicle; 3) yaw sensor, used to measure the yaw angle (rotation) of the motor vehicle, can be compared by the ESC with the data from the steering wheel sensor in order to take a regulating action; and 4) wheel speed sensors used to measure the wheel speeds.

ESC uses, for example, a hydraulic modulator to assure that each wheel receives the correct brake force. A similar modulator is used with anti-lock brake systems (ABS). ABS needs to reduce pressure during braking, only. ESC additionally needs to increase brake pressure in certain situations.

The heart of the ESC system is the electronic control unit (ECU) or electronic control module (ECM), i.e., motor vehicle controller or microprocessor. Diverse control techniques are embedded in the ECU and often, the same ECU is used for diverse systems at the same time (ABS, traction control, climate control, etc.). The desired motor vehicle state is determined based on the steering wheel angle, its gradient and the wheel speed. Simultaneously, the yaw sensor measures the actual state. The controller computes the needed brake or acceleration force for each wheel and directs the actuation of, for example, the valves of an hydraulic brake modulator.

Motor vehicles utilizing electronic stability control systems require some means of determination of the driver's intended motor vehicle behavior (i.e., intended motor vehicle path or track). In General Motors' (GM's) StabiliTrak system these means are accomplished by the driver command interpreter, as described in U.S. Pat. No. 5,941,919, issued Aug. 24, 1999 to the assignee hereof, the entire disclosure of which patent is hereby herein incorporated by reference.

Referring now to FIG. 1, the exemplar control structure described in U.S. Pat. No. 5,941,919 is shown. The controller 10 includes command interpreter 12 receiving the various system inputs 14 from various vehicle sensors. The command interpreter 12 develops desired yaw rate commands responsive to the various system inputs and a data structure 16 stored in non-volatile memory of controller 10. The data structure 16 has a data subset 18 corresponding to vehicle operation in linear mode and a data subset 20 corresponding to vehicle operation in non-linear mode.

When the vehicle operation is in the linear mode, the command interpreter 12, using data structure subset 18, provides commands to a control block 22 designed to maintain the linear response of the vehicle. For example, when the control according to this patent is used to control wheel brakes to affect vehicle yaw control, the commands provided by block 12 do not modify the wheel brake operation while the vehicle is in the linear mode. When the control according to this patent is used to control a vehicle variable force suspension system, the suspension control is provided to maintain the current driving conditions, and not to induce a change in understeer or oversteer.

When the vehicle operation is in the non-linear region, the command interpreter 12, using data structure subset 20, provides commands to the control block 22 commanding a yaw rate linearly responsive to the vehicle steering wheel input. Block 22 uses the command generated at block 12 to control one or more vehicle chassis systems, such as controllable suspension actuators, represented by block 24 and/or brakes, represented by block 26 to bring the actual vehicle yaw into a linear relationship with vehicle steering wheel angle. This control thus maintains the yaw response of the vehicle linear with respect to the steering wheel input even when the vehicle is operating in its nonlinear performance region.

Collision preparation systems are known in the art, as for example exemplified by U.S. Pat. No. 7,280,902 which discloses a motor vehicle deceleration control apparatus; U.S. Pat. No. 7,035,735 which discloses a method and device for automatically triggering a deceleration of a motor vehicle; and U.S. Patent Application Publication 2004/0254729 which discloses a pre-collision assessment of potential collision severity for motor vehicles.

Of particular interest with regard to the present invention, is U.S. Pat. No. 6,084,508, issued Jul. 4, 2000, the disclosure of which patent is hereby herein incorporated by reference. U.S. Pat. No. 6,084,508 discloses a collision preparation system which provides autonomous braking in certain situations. The method and arrangement for emergency braking of a vehicle, include a detection system on the vehicle which detects obstacles located in or near the direction of motion of the vehicle and generates corresponding data, sensors on the vehicle which generate data representing characteristic parameters of the condition of the vehicle, and an evaluating unit which determines, from the data on the obstacles and the parameters of the condition of the vehicle, target values for controlling the motion of the vehicle and, only upon determining that an impending collision of the vehicle with an obstacle is no longer avoidable by any action on the vehicle by steering or braking, triggers an autonomous emergency braking for rapid deceleration of the vehicle.

Problematically, an autonomous braking event as a result of actuation of a collision preparation system (CPS) may involve the actual motor vehicle travel path during the autonomous braking event departing from the driver intended motor vehicle travel path.

Accordingly, what is needed in the art is a motor vehicle travel path control which monitors, during an autonomous braking event, the actual motor vehicle travel path in relation to the driver intended motor vehicle travel path, and in the event a departure from the driver intended motor vehicle path occurs, the motor vehicle travel path control adjusts braking so as to return the motor vehicle travel path to that intended by the driver.

SUMMARY OF THE INVENTION

The present invention is a motor vehicle travel path control which monitors, during an autonomous braking event initiated by a CPS, the actual motor vehicle travel path in relation to the driver intended motor vehicle travel path, and in the event a departure from the driver intended motor vehicle path occurs, the motor vehicle travel path control adjusts braking so as to return the motor vehicle travel path to that intended by the driver.

In this regard, inputs from the motor vehicle and a CPS are evaluated in an electronic controller according to predetermined programming, wherein the braking is adjusted to bring the actual motor vehicle travel path into conformity with the driver intended motor vehicle travel path. For example, in an autonomous braking situation in which the motor vehicle turn radius exceeds that of the driver intended turn radius (i.e., the actual yaw rate is out of conformance with the intended yaw rate due to understeer), as for example due to the inertial forces exceeding the tire road surface grip, the motor vehicle travel path control according to the present invention would adjust the brakes by a rapid sequence of brake reduction commands until the actual and intended yaw rates are in conformity with each other. Thereafter, braking would be allowed to increase up to the CPS braking request, subject to the actual vehicle travel path being in conformity with the driver intended vehicle travel path. Preferably, the braking adjustment provided by the present invention is not performed in the event the driver has requested braking in excess of that requested by the CPS.

Accordingly, it is an object of the present invention to provide a motor vehicle travel path control which keeps the motor vehicle headed in the direction intended by the driver during an autonomous braking event.

This and additional objects, features and advantages of the present invention will become clearer from the following specification of a preferred embodiment.

DESCRIPTION OF THE PREFERRED EMBODIMENT

Figure 2:
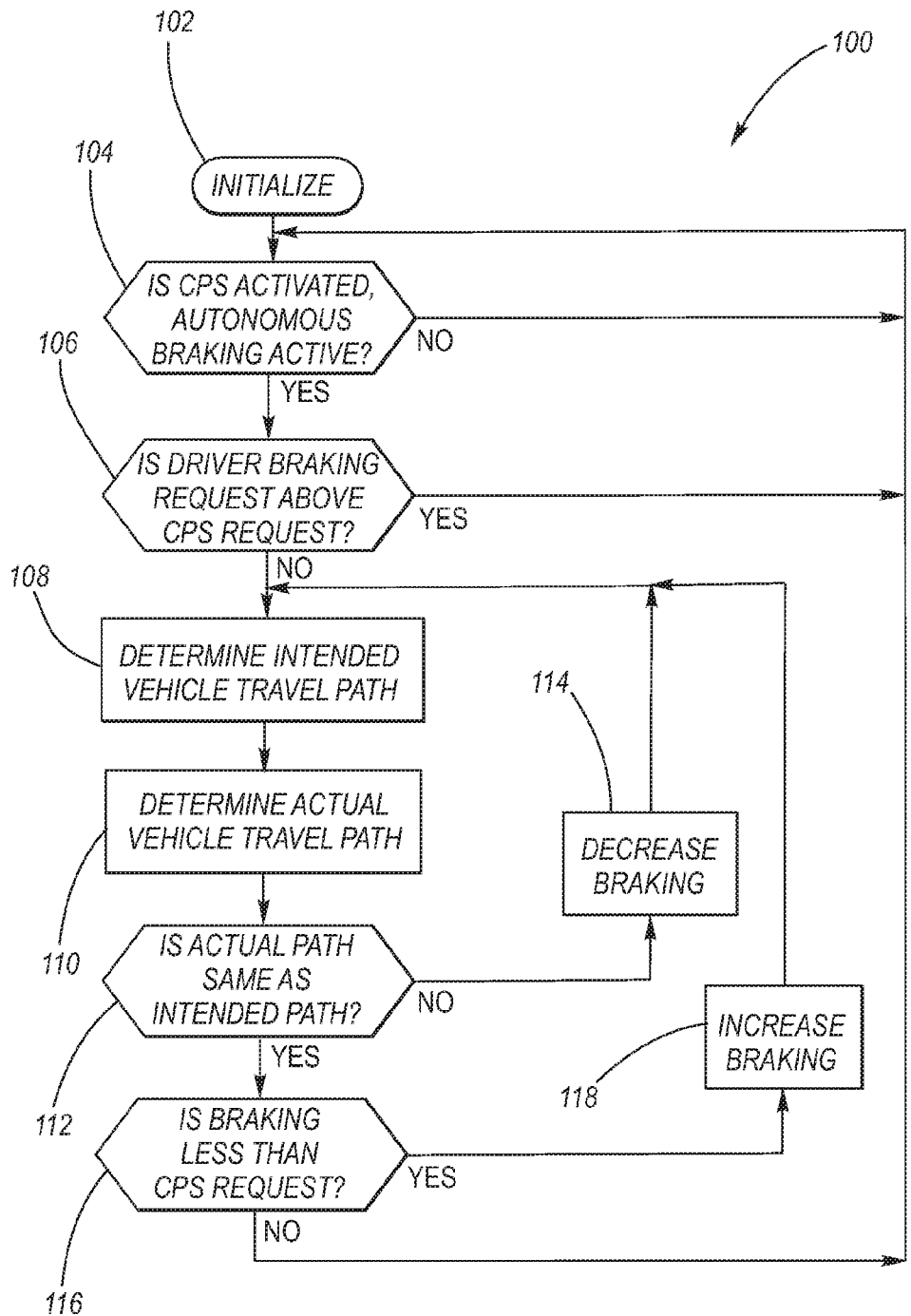
FIG. 2 is a block diagram of an algorithm for implementing programming according to the present invention.
Figure 3A:
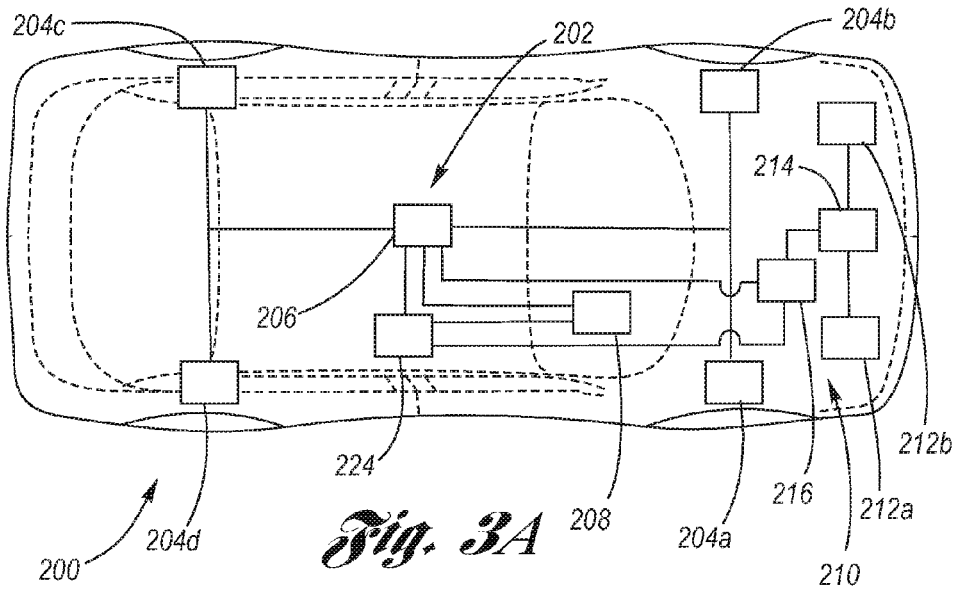
FIG. 3A is a schematic depiction of a motor vehicle equipped with a CPS and an exemplar motor vehicle travel path control in accordance with the present invention.
Figure 3B:
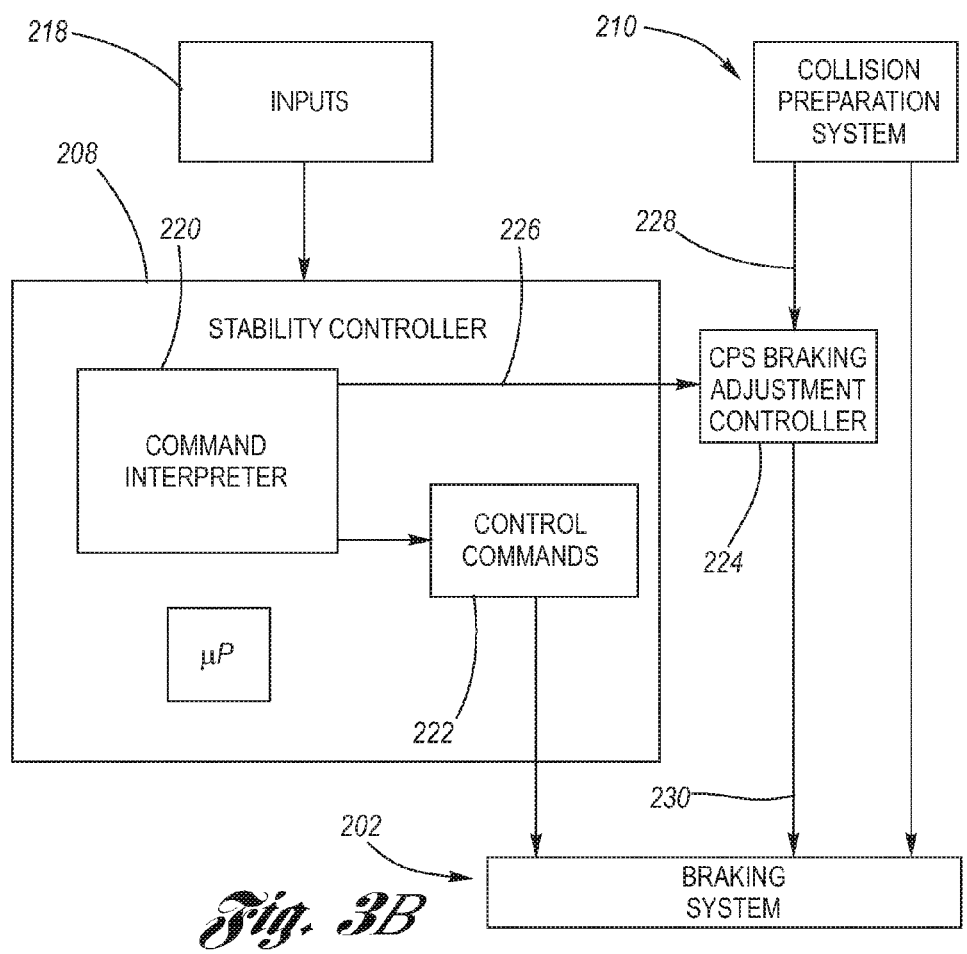
FIG. 3B is a block diagram of an apparatus for carrying out the present invention.
Figure 4:
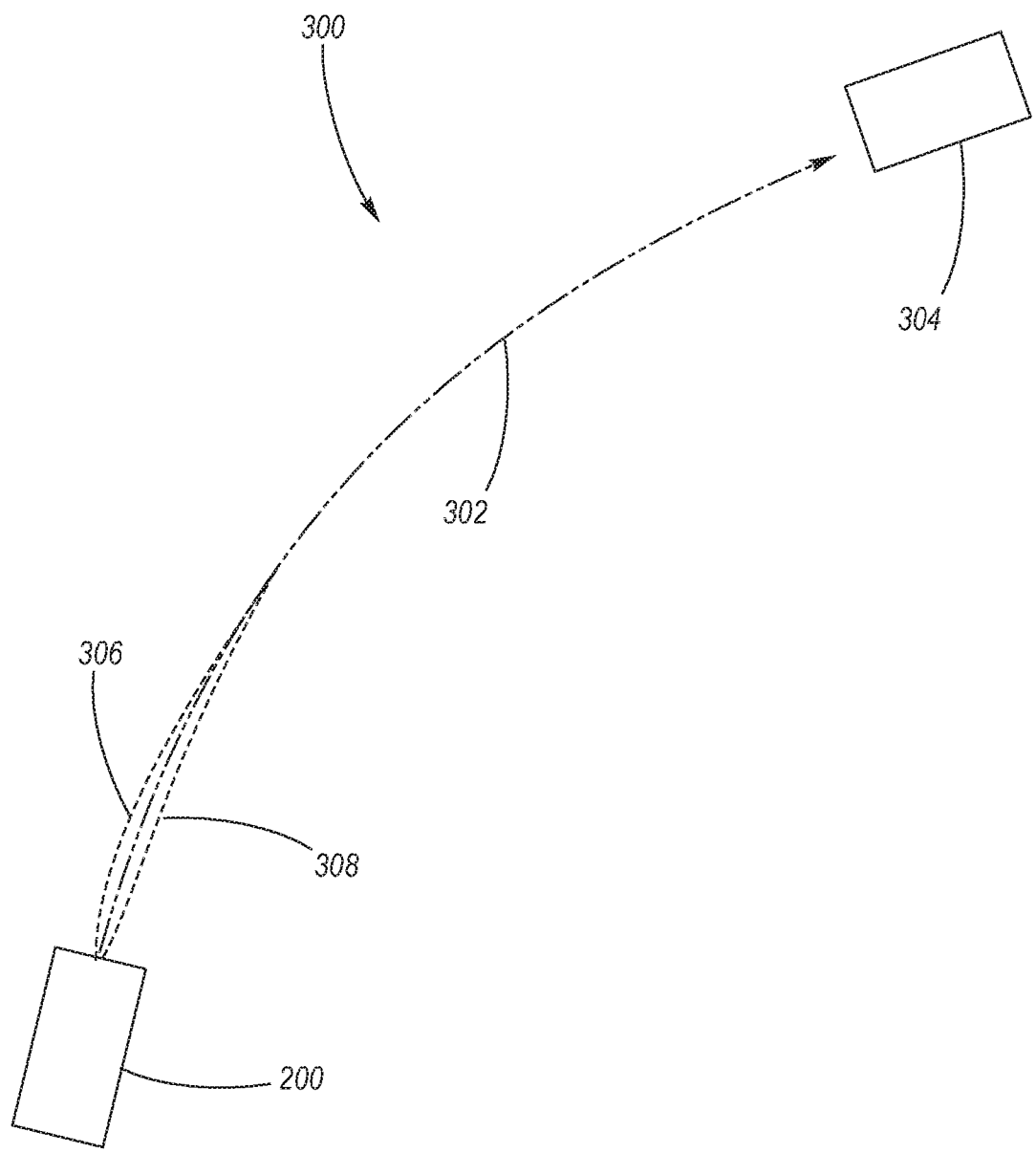
FIG. 4 is a diagrammatic exemplification of operation of the present invention during autonomous braking events.

Referring now to the Drawing, FIGS. 2 through 4 depict an example of a motor vehicle travel path control which is implemented during an autonomous braking event and provides, as necessary, adjustments to braking in order to return the actual motor vehicle travel path back to that intended by the driver.

FIG. 2 is an example of a programming algorithm 100 for carrying out the motor vehicle travel path control according to the present invention, which is resident in an electronic controller, as for example exemplified at 224 of FIGS. 3A and 3B.

Starting at Block 102, the program is initialized. At Decision Block 104, inquiry is made whether a collision preparation system (CPS) has been activated such that autonomous braking has been implemented. If the answer to the inquiry is no, then the program loops back and waits. However, if the answer to the inquiry is yes, then the program advances to Block 106, whereat determination is made whether the driver of the motor vehicle has requested braking in excess (in practice, whether the driver has requested braking is in excess of a predetermined small range around that) of the CPS requested braking. If the answer to the inquiry is yes, then the program loops back and waits. However, if the answer to the inquiry is no, then the program advances to Block 108 whereat the driver intended motor vehicle path is determined, as for example from data received from a steering wheel position sensor. The program then advances to Block 110, whereat the actual motor vehicle travel path is determined, as for example from the output of an electronic stability control command interpreter (see FIG. 3B).

The program next inquires at Decision Block 112 whether the actual travel path of the motor vehicle is the same as the driver intended travel path of the motor vehicle (in practice, this inquiry is whether the difference therebetween is substantially zero, meaning within a predetermined small acceptable difference therebetween). If the answer to the inquiry is no, then at Block 114 the braking is reduced by a preselected decrement of braking (for example, in order to correct an understeer situation in which reduced braking will regain non-slip of the tires with respect to the road surface). The program then returns to Block 108. The program will continue to loop through Blocks 108 through 114 in rapid succession (as for example every 20 milliseconds) until the answer to the inquiry at Decision Block 114 is yes, whereupon the program advances to Decision Block 116.

At Decision Block 116, inquiry is made whether the braking from Block 114 is at a level below (in practice, at a level below a predetermined small range around that of) the CPS requested braking, per Block 106. If the answer to the inquiry is yes, then the program advances to Block 118, whereat braking is increased by a preselected increment of braking. The program then returns to Block 108. The program will continue to loop through Blocks 108 through 112 and then on to either Block 114 or Decision Block 116 and Block 118, as the appropriate answer to the inquiry at Decision Block 112 may be, in rapid succession (as for example every 20 milliseconds) until the answer to the inquiry at Decision Block 116 is no, whereupon the program advances to Decision Block 104.

FIGS. 3A and 3B depict an exemplification of a hardware implementation for the vehicle path control algorithm 100 of FIG. 2.

Figure 1:
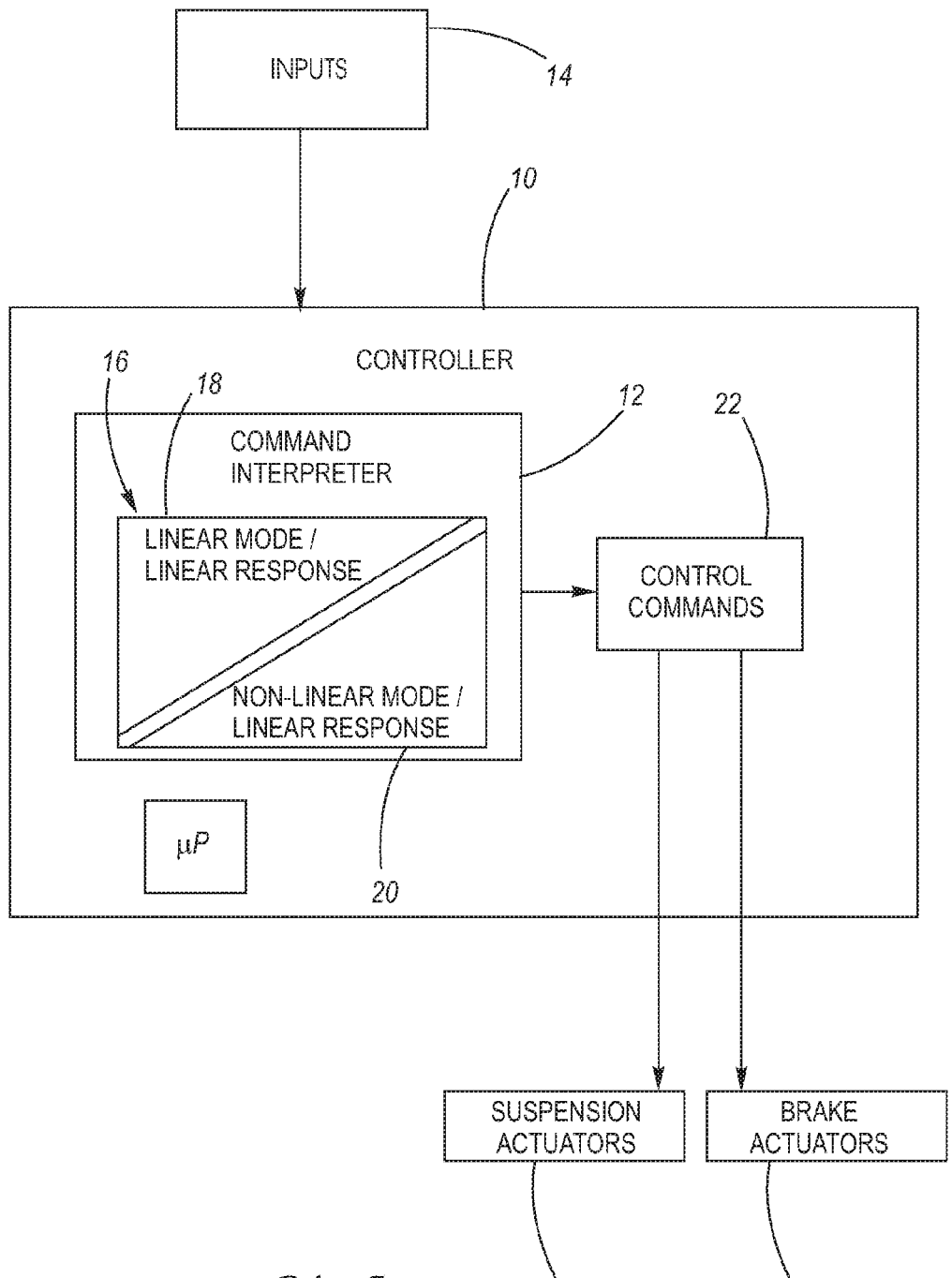
FIG. 1 is a partly block diagram of a prior art electronic stability control system.

FIG. 3A depicts a motor vehicle 200 having a braking system 202 including brake actuators 204a, 204b, 204c, 204d and a brake controller 206. A stability controller 208 operates at least in part as the controller 10 of FIG. 1. A collision preparation system (CPS) 210 is interfaced with the braking system 202. The CPS 210 may be, for example, implemented by the disclosure of U.S. Pat. No. 6,084,508, and may include, for example, short range radar 212a, 212b, long range radar 214 and an evaluating unit 216. A collision preparation system braking adjustment controller 224 is interfaced with the braking system 202 so as to adjust the braking in accordance with the present invention, and receives operational data to carryout its function, as for example from the CPS 210 and the stability controller 208

FIG. 3B depicts the electronic implementation of FIG. 3A, wherein inputs 218 from various sensors and other data sources of the motor vehicle 200 are provided to the stability controller 208. The stability controller 208 includes a command interpreter 220, as for example that shown at 12 of FIG. 1. The stability controller 208 utilizes the command interpreter 220 and the control commands block 222, as for example that shown at 22 of FIG. 1, to control operation of the braking system 202 in the manner described hereinabove with respect to FIG. 1 and U.S. Pat. No. 5,941,919.

According to the example of FIG. 3B, the CPS braking adjustment controller 224 has provided to it, via a data line 226, the driver braking request, the yaw rate and/or other data providing actual motor vehicle travel path information, and the steering wheel position and/or other data providing the driver intended motor vehicle travel path information, all available from the command interpreter 220, and the CPS braking adjustment controller further has available to it, via a data line 228, the activation status of the CPS 210 indicative of the autonomous braking status and the braking request of the CPS. The CPS braking adjustment controller 224 sends a braking reduction signal, via data line 230, to the braking system in the event there is a detected difference (in practice, at least a predetermined small difference) between the driver intended motor vehicle travel path as compared to the actual motor vehicle travel path, wherein, preferably, the driver braking request does not exceed the CPS braking request, as per FIG. 2.

FIG. 4 is a vehicle paths depiction 300 of travel paths for the motor vehicle 200 of FIG. 3A, showing a driver intended motor vehicle path 302 which has in that path an obstruction 304 which has been detected by the CPS (210 of FIGS. 3A and 3B) and in response thereto the CPS has activated and implemented autonomous braking, wherein the CPS braking adjustment controller (224 of FIGS. 3A and 3B) provides, in the two alternative scenarios depicted, either an understeer path correction 306 or an oversteer path correction 308, both being successfully managed by the motor vehicle travel path control according to the present invention.

The following examples exemplify operation of the present invention.

EXAMPLE 1

Motor Vehicle Traveling in a Straight Line

The motor vehicle 200 is traveling on a two lane road and approaches a stalled car in its lane. The driver is inattentive. When the collision is not avoidable, the CPS 210 issues an autonomous braking command of maximum deceleration. The vehicle path control algorithm 100 becomes active. Because the vehicle is traveling in a straight line, the yaw rate is about 0 degrees/second. The steering wheel angle is around zero, indicating that the driver is requesting a yaw rate of 0 degrees/second. Because the actual vehicle path matches the driver-intended path, the commanded deceleration is not lowered. The actual path is checked and compared to the desired path every 20 milliseconds until the event has concluded.

EXAMPLE 2

Motor Vehicle Traveling on a Freeway Entrance Ramp

The motor vehicle 200 is traveling on a circular freeway entrance ramp at a constant speed of 20 m/sec. The radius of the on-ramp is 80 m giving a constant lateral acceleration of 5 m/sec$^2$. There is a driver at the base of the on ramp who, instead of merging onto the freeway, has stopped his/her car. The driver of the traveling motor vehicle 200 is inattentive. When the collision is not avoidable, the CPS 210 issues an autonomous braking command of maximum deceleration. The vehicle path control algorithm 100 becomes active. Initially, the desired yaw rate is a little over 7 degrees per second. The actual yaw rate is also a little over 7 degrees per second. The actual path is checked and compared to the desired path every 20 milliseconds until the event has concluded.

At 220 milliseconds into the event, the actual path is lagging the desired path (understeer) and the vehicle path control algorithm reduces the commanded deceleration to 0.8 G's.

At 240 milliseconds into the event the actual path is still lagging the desired path, so the commanded deceleration is reduced to 0.7 G's.

At 260 milliseconds into the event, the actual path is still lagging the desired path, so the commanded deceleration is reduced to 0.65 G's.

At 280 milliseconds into the event, the actual path is still lagging the desired path, so the commanded deceleration is reduced to 0.60 G's.

At 300 milliseconds into the event, the actual path is still lagging the desired path, so the commanded deceleration is reduced to 0.55 G's.

At 320 milliseconds into the event, the actual path is within the calibrated tolerance to the desired path, so 0.55 G's is commanded.

At 340 milliseconds into the event, the actual path is still within the calibrated tolerance of the desired path, so the vehicle path control algorithm allows commanded deceleration to rise to 0.6 G's.

At 360 milliseconds into the event, the actual path is still within the calibrated tolerance of the desired path.

At 380 milliseconds into the event, the actual path is still within the calibrated tolerance of the desired path, and the vehicle path control algorithm allows commanded deceleration to rise to 0.65 G's.

At 400 milliseconds into the event, the actual path is found to be lagging the desired path, so the commanded deceleration is reduced to 0.6 G's.

For the next 300 milliseconds, the actual path is within the calibrated tolerance to the actual path, and the vehicle path control algorithm keeps the deceleration at 0.6 G's.

At 720 milliseconds, the actual path is within the calibrated tolerance to the actual path, and the vehicle path control algorithm calculates that the total acceleration of the vehicle has dropped enough that it can command 0.65 G's of deceleration.

At 740 milliseconds into the event, the actual path is still within the calibrated tolerance of the desired path.

At 760 milliseconds into the event, the actual path is still within the calibrated tolerance of the desired path.

For the next 360 milliseconds, the actual path is within the calibrated tolerance to the actual path, and the vehicle path control algorithm keeps the deceleration at 0.6 G's.

At 1,140 milliseconds, the actual path is within the calibrated tolerance to the actual path, and the vehicle path control algorithm calculates that the total acceleration of the vehicle has dropped enough that it can command 0.7 G's of deceleration.

At 1,380 milliseconds, impact to the target vehicle occurs.

EXAMPLE 3

Motor Vehicle Traveling in a Straight Line with Evasive Maneuver

The motor vehicle 200 is traveling on a two lane road and approaches a stalled car in its lane. The driver is inattentive. When the collision is not avoidable, the CPS 210 issues an autonomous braking command of maximum deceleration. The vehicle path control algorithm 100 becomes active. Because the vehicle is traveling in a straight line, the yaw rate is about 0 degrees/second. The steering wheel angle is around zero, indicating that the driver is requesting a yaw rate of 0 degrees/second. Because the actual vehicle path matches the driver-intended path, the commanded deceleration is not lowered. The actual path is checked and compared to the desired path every 20 milliseconds until the event has concluded.

At 580 milliseconds into the event, the driver steers hard to the right.

At 600 milliseconds into the event, the actual path is still within the calibrated tolerance of the desired path.

At 620 milliseconds into the event, the actual path is still within the calibrated tolerance of the desired path.

At 640 milliseconds into the event, the actual path is still within the calibrated tolerance of the desired path.

At 660 milliseconds into the event, the combined lateral and longitudinal acceleration have exceeded the friction limits of the surface. Consequently, the actual path is now lagging the desired path, and the algorithm reduces the commanded deceleration to 0.85 G's.

At 680 milliseconds into the event, the actual path is still lagging the desired path, so the commanded deceleration is reduced to 0.75 G's.

At 700 milliseconds into the event, the actual path is still lagging the desired path, so the commanded deceleration is reduced to 0.70 G's.

At 720 milliseconds into the event, the actual path is within the calibrated tolerance to the desired path, so 0.60 G's is commanded.

At 740 milliseconds into the event, the actual path is still lagging the desired path, so the commanded deceleration is reduced to 0.55 G's.

At 760 milliseconds into the event, the actual path is still lagging the desired path, so the commanded deceleration is reduced to 0.50 G's.

At 780 milliseconds into the event, the actual path is still lagging the desired path, so the commanded deceleration is reduced to 0.45 G's.

At 800 milliseconds into the event, the actual path is within the calibrated tolerance to the desired path, so 0.45 G's is commanded.

At 820 milliseconds into the event, the actual path is lagging the desired path, so the commanded deceleration is reduced to 0.40 G's.

At 840 milliseconds into the event, the actual path is lagging the desired path, so the commanded deceleration is reduced to 0.35 G's.

At 860 milliseconds into the event, the actual path is lagging the desired path, so the commanded deceleration is reduced to 0.30 G's.

At 880 milliseconds into the event, the actual path is within the calibrated tolerance to the desired path, so 0.30 G's is commanded.

For the next 300 milliseconds of the event, the actual path is within the calibrated tolerance to the desired path, and the resultant acceleration is close to the friction limit that the tire/road interface can support, so 0.30 G's is commanded.

At 1,200 milliseconds, the actual path is within the calibrated tolerance to the desired path, and the resultant acceleration has dropped far enough away from the friction limit that the tire/road interface can support, so the commanded deceleration level is raised to 0.35 G's.

At 1,220 milliseconds into the event, the actual path is within the calibrated tolerance to the desired path, so 0.35 G's is commanded.

At 1,240 milliseconds into the event, collision with the host vehicle occurs.

EXAMPLE 4

Motor Vehicle Traveling on a Freeway Entrance Ramp; Driver Late-Braking

The motor vehicle 200 is traveling on a circular freeway entrance ramp at a constant speed of 20 m/sec. The radius of the on ramp is 80 m giving a constant lateral acceleration of 5 m/sec$^2$. There is a driver at the base of the ramp who instead of merging onto the freeway has stopped his/her car. The driver of the traveling motor vehicle 200 is inattentive. When the collision is not avoidable, the CPS 210 issues an autonomous braking command of maximum deceleration. The vehicle path control algorithm 100 becomes active. Initially, the desired yaw rate is a little over 7 degrees/second. The actual yaw rate is also a little over 7 degrees per second. The actual path is checked and compared to the desired path every 20 milliseconds until the event has concluded.

At 220 milliseconds into the event, the actual path is lagging the desired path (understeer) and the vehicle path control algorithm reduces the commanded deceleration to 0.8 G's.

At 240 milliseconds into the event the actual path is still lagging the desired path, so the commanded deceleration is reduced to 0.7 G's.

At 260 milliseconds into the event, the actual path is still lagging the desired path, so the commanded deceleration is reduced to 0.65 G's.

At 280 milliseconds into the event, the actual path is still lagging the desired path, so the commanded deceleration is reduced to 0.60 G's.

At 300 milliseconds into the event, the actual path is still lagging the desired path, so the commanded deceleration is reduced to 0.55 G's.

At 320 milliseconds into the event, the actual path is within the calibrated tolerance to the desired path, so 0.55 G's is commanded.

At 340 milliseconds into the event, the driver presses on the brake, commanding 0.8 G's of deceleration. The driver is now requesting more deceleration than the CPS, so the actual path is not compared to the desired path.

At 360 milliseconds into the event, the driver is requesting more deceleration than the CPS, so the actual path is not compared to the desired path.

For every 20 milliseconds until the duration of the event, the driver is requesting more deceleration than the CPS, so the actual vehicle path is not compared to the desired vehicle path, and the commanded deceleration is not modified.

In accordance with the foregoing description, the vehicle path control algorithm 100 according to the present invention is intended to maintain the motor vehicle moving in the direction of the driver intended travel path by selectively adjusting the braking applied by the CPS and operates independently of a stability control system, if present (it is to be understood in this regard that a data line is taken from the command interpreter in FIG. 3B merely as an exemplification of a modality to provide necessary data to the CPS braking adjustment controller).

A stability control system (as for example discussed in U.S. Pat. No. 5,941,919) is intended to provide vehicle stability by adjusting the braking at the wheels individually and/or adjusting engine power. As such, the brake controller will follow commands of the stability control system in the event a conflict occurs with respect to braking adjustment by vehicle path control algorithm 100.

Further it to be understood that the vehicle path control algorithm 100 applies to autonomous braking, in the sense that the autonomous braking is additive to driver is requested braking. For example when autonomous braking is implemented by a CPS, the present invention adjusts the braking in the event the actual vehicle travel path is at least substantially different from the driver intended vehicle path and the autonomous braking is generally above what the driver is requesting, if any.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A travel path control method implemented distinctly with respect to vehicle stability control during activation of autonomous braking, comprising the steps of:
   detecting activation of a collision preparation system in which the collision preparation system is implementing autonomous braking of a motor vehicle;
   detecting a driver intended travel path of the motor vehicle during the activation;
   detecting an actual travel path of the motor vehicle during the activation;
   detecting a driver braking request;
   detecting an autonomous braking request of the collision preparation system;
   comparing the driver intended travel path to the actual travel path during the activation;
   detecting vehicle stability by a vehicle stability control;
   adjusting braking by the vehicle stability control so as to provide vehicle stability,
   adjusting the braking of the motor vehicle by a collision preparation system braking adjustment control distinctly with respect to the vehicle stability control, if the actual travel path is different from substantially the driver intended travel path and if the driver braking request is less than substantially the autonomous braking request of the collision preparation system, wherein the adjusting of the braking by the collision preparation system braking adjustment control is intended to reduce the difference;
   wherein in event of conflict as regards braking adjustments by the vehicle stability control and the collision preparation system braking adjustment control, braking adjustment by the vehicle stability control prevails over braking adjustment by the collision preparation system braking adjustment control.

2. The method of claim 1, further comprising increasing the braking until the braking is equal to substantially the autonomous braking request, provided the difference is not increased thereby.

3. The method of claim 2, wherein said step of adjusting comprises decreasing braking until the difference is reduced to substantially zero.

4. A travel path control system for a motor vehicle, comprising:
   a braking system;
   a collision preparation system interfaced with said braking system, wherein said collision preparation system selectively implements autonomous braking of the motor vehicle during activation thereof responsive to predetermined conditions of travel of the motor vehicle;
   a vehicle stability controller interfaced with said braking system and said collision preparation system, said vehicle stability controller adjusting braking so as to provide vehicle stability;
   a collision preparation system braking adjustment controller distinct from said stability controller and interfaced with said braking system, wherein activation status of said collision preparation system and braking request of the collision preparation system are available to said collision preparation system braking adjustment controller; and
   at least one source of data available to said collision preparation system braking adjustment controller, said data comprising driver braking request, actual motor vehicle travel path and driver intended motor vehicle travel path;
   wherein, if said collision preparation system is actively providing autonomous braking and the braking request of the collision preparation system exceeds substantially the driver braking request, then said collision preparation system braking adjustment controller compares the driver desired travel path to the actual travel path during the activation, and adjusts the autonomous braking of the motor vehicle by the collision preparation system distinctly from said vehicle stability controller if the actual travel path is different from substantially the driver desired travel path, wherein the adjusting of the autonomous braking by the collision preparation system braking adjustment controller is intended to reduce the difference; and
   wherein in event of conflict as regards braking adjustments by said vehicle stability controller and said collision preparation system braking adjustment controller, braking adjustment by said vehicle stability controller prevails over braking adjustment by said collision preparation system braking adjustment controller.

5. The system of claim 4, wherein the comparison by the collision preparation system braking adjustment controller is performed repeatedly with a predetermined timing during the activation.

6. The system of claim 5, wherein the timing is substantially 20 milliseconds.

7. The system of claim 4, wherein said vehicle stability controller provides said data.

8. The system of claim 7, wherein the comparison by the collision preparation system braking adjustment controller is performed repeatedly with a predetermined timing during the activation.

9. The system of claim 8, wherein the timing is substantially 20 milliseconds.

* * * * *